United States Patent
Liu et al.

(10) Patent No.: US 12,537,423 B2
(45) Date of Patent: Jan. 27, 2026

(54) CALIBRATION METHOD FOR ROTATION ANGLE SENSOR

(71) Applicant: HITACHI ASTEMO, LTD., Hitachinaka (JP)

(72) Inventors: Huajun Liu, Hitachinaka (JP); Masaki Kashima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 279 days.

(21) Appl. No.: 17/800,182

(22) PCT Filed: Feb. 5, 2021

(86) PCT No.: PCT/JP2021/004315
§ 371 (c)(1),
(2) Date: Aug. 16, 2022

(87) PCT Pub. No.: WO2021/166682
PCT Pub. Date: Aug. 26, 2021

(65) Prior Publication Data
US 2023/0054469 A1    Feb. 23, 2023

(30) Foreign Application Priority Data
Feb. 18, 2020  (JP) .................. 2020-025058

(51) Int. Cl.
*H02K 11/215*   (2016.01)
*B62D 5/04*     (2006.01)
*H02P 6/16*     (2016.01)

(52) U.S. Cl.
CPC ............ *H02K 11/215* (2016.01); *B62D 5/046* (2013.01); *H02P 6/16* (2013.01)

(58) Field of Classification Search
CPC ...... G01D 18/008; G01D 5/145; H02P 21/18; H02P 6/16; H02K 11/215; B62D 5/046
See application file for complete search history.

(56) References Cited

U.S. PATENT DOCUMENTS

2016/0231142 A1* 8/2016 Kawano ................. H02K 29/08

FOREIGN PATENT DOCUMENTS

| JP | 2007-064771 A | 3/2007 |
| JP | 2011-097679 A | 5/2011 |

(Continued)

OTHER PUBLICATIONS

JP2011097679A English translation (Year: 2024).*

(Continued)

*Primary Examiner* — Christopher M Koehler
*Assistant Examiner* — Viswanathan Subramanian
(74) *Attorney, Agent, or Firm* — FOLEY & LARDNER LLP

(57) ABSTRACT

A motor shaft is rotated to a predetermined rotation stop position by excitation of two-phase coils out of three-phase coils of a stator coil, and a detection value of a rotation angle sensor at the rotation stop position is acquired. Further, a sensor-error correction parameter for correcting a detection value of the rotation angle sensor in drive control of an electric motor is generated from the acquired detection value of the rotation angle sensor. With this configuration, in rotating a motor rotor to the predetermined rotation stop position, two coils out of the three-phase coils of the stator coil are excited. By sequentially changing the coils being excited, it is possible to cause the motor rotor to stop accurately at the predetermined rotation stop position.

9 Claims, 10 Drawing Sheets

(56) References Cited

FOREIGN PATENT DOCUMENTS

| JP | 3210616 U | 6/2017 |
| JP | 2018-072086 A | 5/2018 |
| JP | 2018-139478 A | 9/2018 |
| JP | 2020-137222 A | 8/2020 |

OTHER PUBLICATIONS

Notice of Reasons for Refusal dated May 23, 2023 issued in corresponding JP Application No. 2020- 025058, with English Machine Translation, 14 pages.
International Search Report dated Mar. 23, 2021 issued in International Application No. PCT/JP2021/004315, with English translation, 5 pages.
Written Opinion of the International Searching Authority dated Mar. 23, 2021 issued in International Application No. PCT/JP2021/004315, with English translation, 9 pages.

\* cited by examiner

CALIBRATION METHOD FOR ROTATION ANGLE SENSOR

TECHNICAL FIELD

The present invention relates to a calibration method for a rotation angle sensor which detects a rotation angle of a motor shaft of an electric motor.

BACKGROUND ART

In general, in a steering apparatus that assists steering force by using a three-phase brushless electric motor or performs automatic steering by using an electric motor, a steering shaft (rack bar, for example) is coupled to a ball screw mechanism to be driven by the electric motor. The apparatus has a configuration in which rotational force of the electric motor is transmitted from a motor-side pulley provided onto a drive shaft of the electric motor to a nut-side pulley that rotates in conjunction with a nut, via a belt.

In addition, a three-phase brushless electric motor is used as drive sources of various in-vehicle actuators, such as a drive source of an electric water pump that pressure-feeds refrigerant in a cooling system of an internal combustion engine and a drive source of an electric oil pump installed in a hydraulic pump system for an automatic transmission.

Therefore, the present invention described below can be applied to three-phase brushless electric motors for various uses.

In the meantime, in such a three-phase brushless electric motor, a rotation angle of a motor shaft is detected by using a rotation angle sensor, and a current fed to a stator coil of the electric motor is controlled based on the rotation angle. Due to eccentricity of the motor shaft, variation in magnetization strength, or the like during a manufacturing process or an assembling process, the rotation angle sensor produces a rotation angle error. When such a rotation angle error is produced, adverse influence such as variation in motor torque occurs.

In order to eliminate such influence of a rotation angle error, a calibration operation (calibration) of the rotation angle sensor is required. For example, a method as described in JP 2007-64771 A (Patent Literature 1) is known.

In Patent Literature 1, the following configuration is described. A rotation angle error between a reference value (true value) of a rotation angle to be detected and a detection value detected by a rotation angle sensor is subjected to fast Fourier transform (FFT) to obtain a frequency component of a predetermined order. The frequency component of the rotation angle error is then subjected to inverse fast Fourier transform (IFFT) to be converted into an angle error, and a correction value is calculated. The calculated correction value is reflected in the detection value detected by the rotation angle sensor, and thus the rotation angle error is compensated for.

CITATION LIST

Patent Literature

PTL 1: JP 2007-64771 A

SUMMARY OF INVENTION

Technical Problem

In the method as described in Patent Literature 1, in order to obtain a rotation angle error, a stator coil is excited by causing a predetermined current to flow therethrough, and thus a motor rotor is rotated through a predetermined rotation angle and a rotation angle is detected. Then, a rotation angle error is obtained based on the detected detection value and a reference value (true value) of the rotation angle at that time.

However, when the motor rotor is rotated by using all of three-phase coils, there occurs a phenomenon in which the motor rotor cannot stop accurately at a desired predetermined rotation stop position. For this reason, only an inaccurate detection value can be output, which causes a problem of difficulty in obtaining an accurate rotation angle error required for fast Fourier transform.

Further, an external servo mechanism or the like is required in order to enable accurate stop at the predetermined rotation stop position. This necessitates extra expenditure for equipment, which is undesirable also in terms of manufacture.

Solution to Problem

An object of the present invention is to provide a novel calibration method for a rotation angle sensor with which it is possible to minimize extra expenditure for equipment and to cause a motor rotor to stop accurately at a predetermined rotation stop position.

According to one embodiment of the present invention, there is provided a calibration method for a rotation angle sensor for an electric motor, the electric motor including: a stator coil including three-phase coils of a U phase, a V phase, and a W phase; a motor rotor to be rotated by excitation of the stator coil; a motor shaft to be rotated in conjunction with the motor rotor; and a rotation angle sensor configured to detect a rotation position of the motor shaft, the method including: an excitation step including the steps of: exciting a predetermined single-phase coil or a first pair of coils including predetermined two-phase coils out of the three-phase coils of the stator coil, to thereby rotate the motor shaft to a first rotation stop position; and exciting a coil different from the predetermined single-phase coil or a second pair of coils different from the first pair of coils, to thereby rotate the motor shaft to a second rotation stop position; a rotation-position detection step including the steps of: acquiring a detection value of the rotation angle sensor at the first rotation stop position; and acquiring a detection value of the rotation angle sensor at the second rotation stop position; and a sensor-error correction parameter generation step of generating a sensor-error correction parameter for correcting a detection value of the rotation angle sensor in drive control of the electric motor, from the detection values of the rotation angle sensor acquired in the rotation-position detection step.

According to the calibration method for a rotation angle sensor of the one embodiment of the present invention, when the motor rotor is rotated to the predetermined rotation stop position, the predetermined single-phase coil or the first pair of coils including the predetermined two-phase coils out of the three-phase coils of the stator coil are excited. By sequentially changing the coils being excited, it is possible to cause the motor rotor to stop accurately at the predetermined rotation stop position.

The rotation stop position depends on a phase of a coil being excited and has extremely high reproducibility. In other words, the motor rotor can be caused to stop at substantially the same rotation stop position even after the excitation step is performed a plurality of times.

As described above, the sensor-error correction parameter is generated by using a detection value of the rotation angle sensor that is detected at a highly-reproducible rotation stop position of the motor rotor, thereby being capable of obtaining a highly accurate correction value of the rotation angle sensor.

DESCRIPTION OF EMBODIMENTS

Now, a detailed description is given of an embodiment of the present invention with reference to the drawings, but the present invention is not limited to the following embodiment, and includes various modifications and application examples in the scope thereof within a technical concept of the present invention.

The embodiment described below shows an example of an electric power steering apparatus, but the embodiment can be applied to other applicable products as described above and thus is not limited to an electric power steering apparatus.

Figure 1:
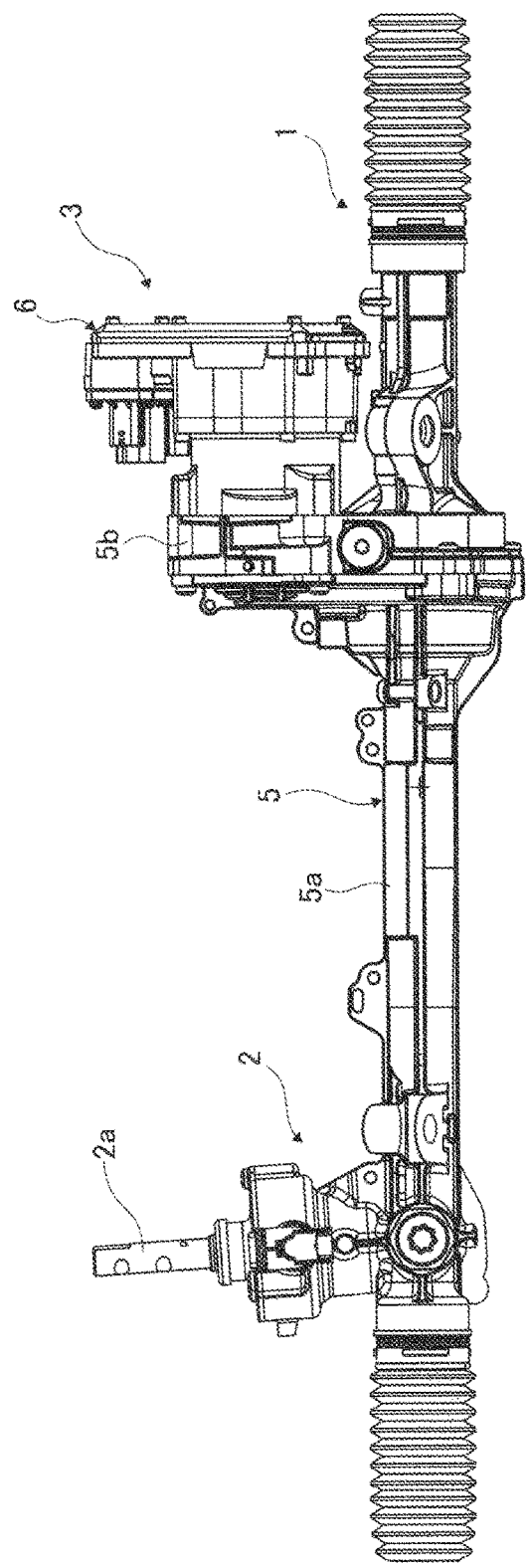
FIG. 1 is a front view of an electric power steering apparatus as seen from a front side of a vehicle.
Figure 2:
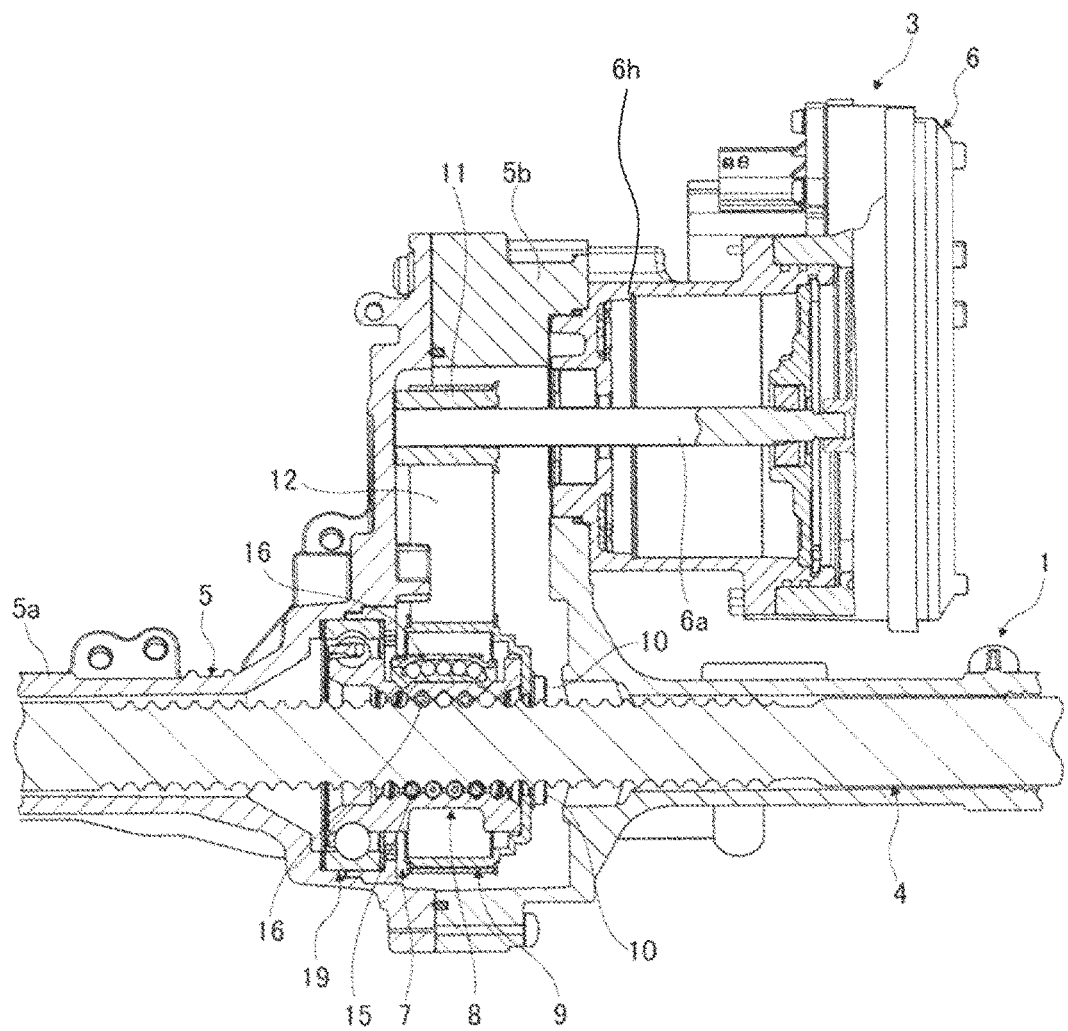
FIG. 2 is a cross-sectional view of an assist mechanism illustrated in FIG. 1.

FIG. 1 is a view of an electric power steering apparatus as seen from a front side of a vehicle. FIG. 2 shows a cross section of parts near an assist mechanism of FIG. 1.

In FIG. 1 and FIG. 2, an electric power steering apparatus 1 includes a steering mechanism 2 and an assist mechanism 3. The steering mechanism 2 transmits rotation of a steering wheel that is rotated by a driver's operation, to a steering shaft (hereinafter referred to as "rack bar") 4 that turns front wheels (steered wheels). The steering mechanism 2 includes a steering shaft 2a coupled to the steering wheel and a pinion shaft (not shown) engaged with a rack of the rack bar 4.

The steering shaft 2a and the pinion shaft are coupled to each other by a torsion bar. The assist mechanism 3 applies assisting force for lightening a steering load on a driver to the rack bar 4. The steering mechanism 2 and the assist mechanism 3 are accommodated inside a housing 5 including a rack-bar accommodating portion 5a and a deceleration-mechanism accommodating portion 5b.

The rack-bar accommodating portion 5a accommodates the rack bar 4 such that the rack bar 4 can move in an axial direction. The deceleration-mechanism accommodating portion 5b is placed in an intermediate portion of the rack-bar accommodating portion 5a in the axial direction and accommodates a deceleration mechanism described later.

As illustrated in FIG. 2, the assist mechanism 3 includes an electric motor 6 and a ball screw mechanism 7. The electric motor 6 has an output controlled by a controller (not shown) in accordance with torsion-bar torque (steering torque), a vehicle speed, and the like. The ball screw mechanism 7 converts rotational motion of the electric motor 6 into linear motion and transmits the linear motion to the rack bar 4.

The electric motor 6 is accommodated inside a motor housing 6h fixed to the deceleration-mechanism accommodating portion 5b, and mainly includes a stator coil, a motor rotor, a motor shaft, a bearing supporting the motor shaft, and the like.

A rotation angle sensor is provided to the electric motor 6, and the rotation angle sensor includes a sensor magnet and a detection element. The sensor magnet is provided onto the motor shaft, and the detection element is provided at a position at which the detection element can detect a change in magnetic field generated by the sensor magnet.

The above-mentioned electric motor 6 is a three-phase brushless motor, and the number of slots thereof is N. In an "excitation step" described later, the motor shaft can be rotated to N rotation stop positions or to twice as many rotation stop positions as N.

In this embodiment, the number of slots is set to 12, and the motor shaft is rotated to 24 rotation stop positions equal to twice the number of slots in the "excitation step" of a calibration method described later. That is, rotation angles at 24 rotation stop positions can be detected per rotation of the motor shaft.

This is because a more accurate sensor-error correction parameter can be generated by measurement of rotation angles of the rotation angle sensor in the maximum number that allows control of rotation stop of the motor shaft in a three-phase brushless motor with 12 slots.

Referring back to FIG. 2, the ball screw mechanism 7 includes a nut 8 and a nut-side pulley 9. The nut-side pulley 9 is formed in a cylindrical shape surrounding the nut 8. The nut-side pulley 9 is fastened to the nut 8 by four fixing bolts serving as a fixing unit. The nut-side pulley 9 is formed of a synthetic resin for the purpose of reducing the weight thereof.

A motor-side pulley 11 having a cylindrical shape is fixed to a motor shaft 6a of the electric motor 6. The motor-side pulley 11 is placed at a position offset with respect to a rotation axis of a nut body in a radial direction, includes a motor-pulley winding portion formed in a cylindrical shape, and is driven to rotate by the electric motor 6. Further, a belt (transmission member) 12 is wound between the nut-side pulley 9 and the motor-side pulley 11. The nut-side pulley 9 has an outer diameter larger than an outer diameter of the motor-side pulley 11.

Thus, the motor-side pulley 11, the belt 12, and the nut-side pulley 9 function as a deceleration mechanism of the electric motor 6. The motor-side pulley 11, the belt 12, and the nut-side pulley 9 are accommodated inside the deceleration-mechanism accommodating portion 5b.

The nut 8 is formed in a cylindrical shape surrounding the rack bar 4. The nut 8 is supported by a ball bearing 19 such that the nut 8 can freely rotate with respect to the housing 5. A nut-side ball screw groove 13 having a spiral shape is formed in an inner periphery of the nut 8. Meanwhile, a rack-bar-side ball screw groove 14 having a spiral shape is formed in an outer periphery of the rack bar 4.

The nut-side ball screw groove 13 and the rack-bar-side ball screw groove 14 form a ball circulation groove 15. The ball circulation groove 15 is filled with a plurality of metal balls 16. In the ball screw mechanism 7, the balls 16 move in the ball circulation groove 15 as the nut 8 rotates, and thus the rack bar 4 moves with respect to the nut 8 in the axial direction.

Figure 3:
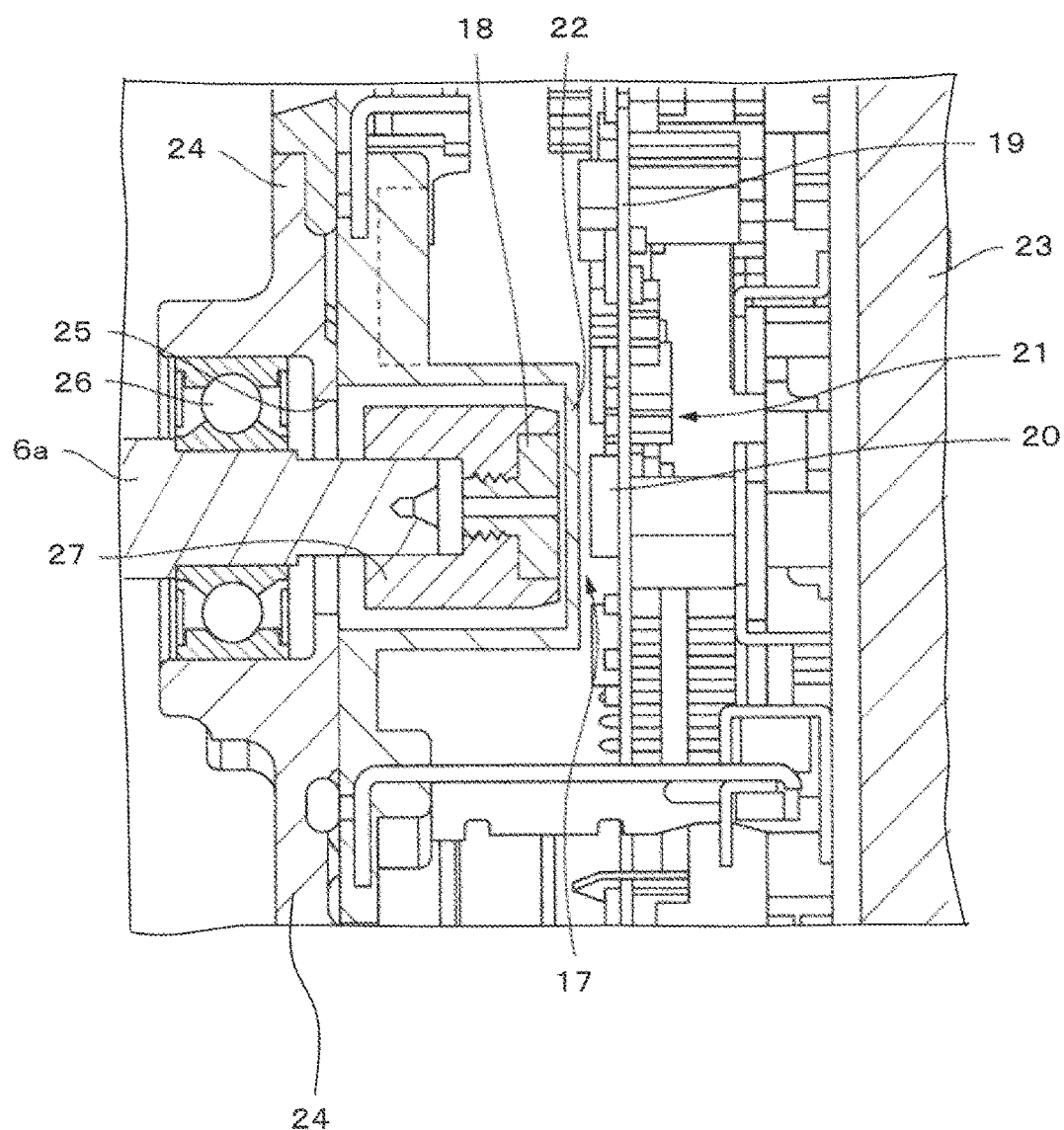
FIG. 3 is an enlarged view of a principal part near a rotation angle sensor of the assist mechanism of FIG. 2.

FIG. 3 shows an enlarged cross section of parts near a rotation angle sensor 17 provided near a tip end of the motor shaft 6a opposite to the motor-side pulley 11. The rotation angle sensor 17 includes a sensor magnet 18 provided at the tip end of the motor shaft 6a of the electric motor 6 and a magnetic sensor (GMR sensor) 20 provided at a position at which the magnetic sensor 20 faces the sensor magnet 18 on a control board 19. A control/drive circuit 21 is mounted on the control board 19.

The magnetic sensor 20 detects a change in magnetic field that is caused when the sensor magnet 18 rotates in conjunction with the motor shaft 6a, and outputs the change to a control unit described later, as a rotation angle of the motor rotor (=a motor-shaft rotation angle).

It is preferred that the magnetic sensor 20 be placed closer to a control-unit housing 23 than a magnet cover 22, but the magnetic sensor 20 may be provided in a motor housing 24 in some cases. The motor housing 24 corresponds to the motor housing 6h of FIG. 2.

An end of the motor shaft 6a closer to the control-unit housing 23 passes through a shaft insertion hole 25 of the motor housing 24, and is positioned in the control-unit housing 23. The motor shaft 6a is pivotally supported by a bearing 26 such that the motor shaft 6a can freely rotate with respect to the motor housing 24.

The sensor magnet 18 is held by the tip end of the motor shaft 6a (a portion positioned in the control-unit housing 23) through intermediation of a magnet holder 27. In the magnet holder 27, the sensor magnet 18 is press-fit, and further, the tip end portion of the motor shaft 6a is press-fit. The sensor magnet 18 is magnetized to the N pole and the S pole at a predetermined number of portions thereof around the rotation axis of the motor shaft 6a.

In the sensor magnet 18, a press-fit portion extending from an approximate center of a disc-shaped member is erected, and the press-fit portion is press-fit in the magnet holder 27. The sensor magnet 18, while being held by the magnet holder 27, has surfaces other than a surface facing the magnetic sensor 20 surrounded by the magnet holder 27. Thus, the sensor magnet 18 is shielded from an external magnetic field by the magnet holder 27.

Figure 4:
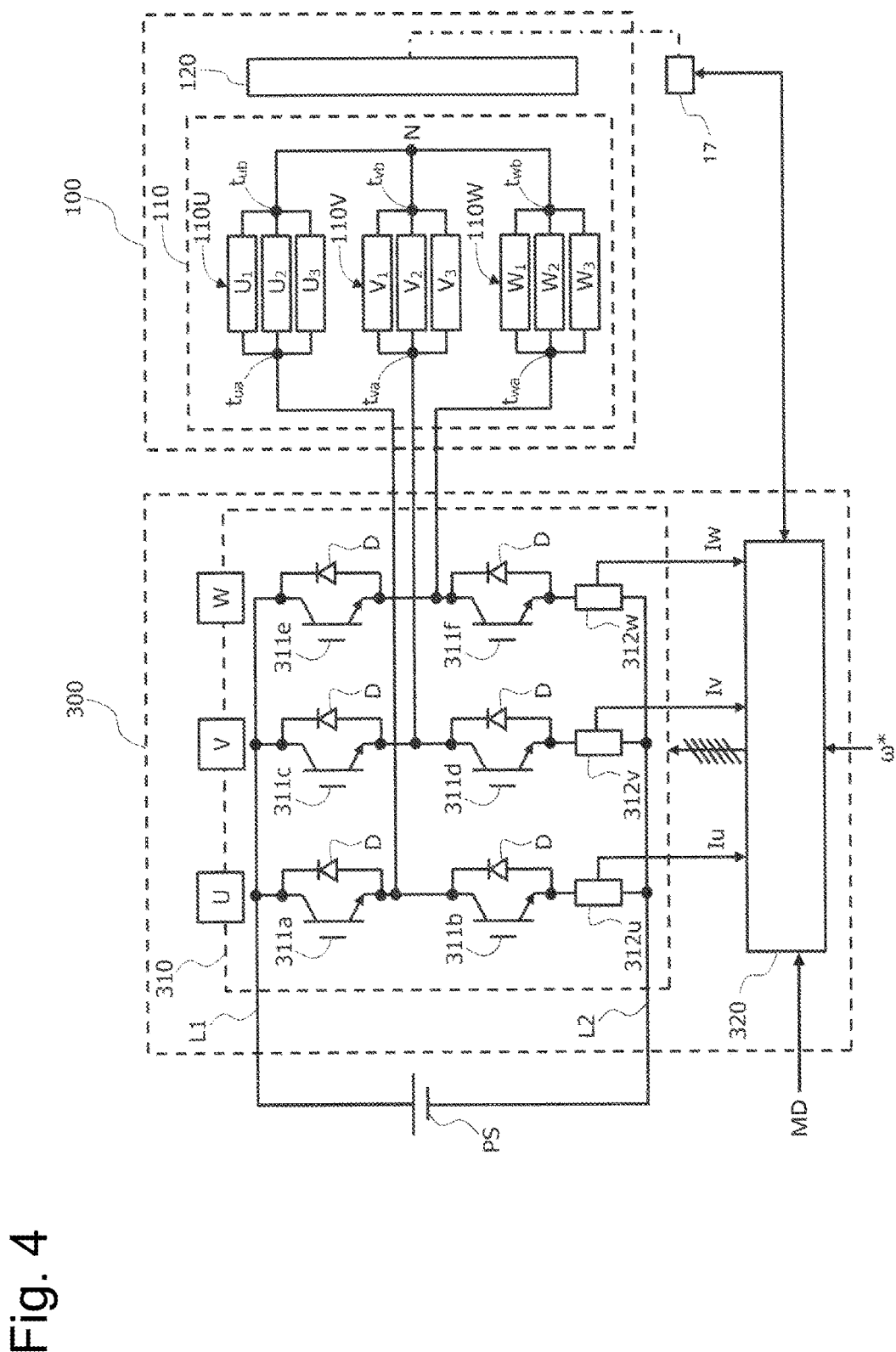
FIG. 4 is a configuration diagram of a control device for an electric motor.

Next, a drive circuit of an electric motor is described with reference to FIG. 4. A three-phase brushless electric motor (corresponding to the electric motor 6 of FIG. 2) 100 includes a stator 110 including three-phase coils 110U, 110V, and 110W and a motor rotor 120 supported rotatably with respect to the stator 110. Additionally, the motor shaft 6a is fixed to the motor rotor 120 as is well known (see FIG. 2). In the stator 110, the U-phase coil 110U includes three coil pieces U1, U2, and U3 connected in parallel (or connected in series), the V-phase coil 110V includes three coil pieces V1, V2, and V3 connected in parallel (or connected in series), and the W-phase coil 110W includes three coil pieces W1, W2, and W3 connected in parallel (or connected in series).

One end "tua" of the U-phase coil 110U, one end "tva" of the V-phase coil 110V, and one end "twa" of the W-phase coil 110W are connected to a controller 300, and another end "tub" of the U-phase coil 110U, another end "tvb" of the V-phase coil 110V, and another end "twb" of the W-phase coil 110W are Y-connected (or star-connected) at a neutral point N.

Further, a magnetic sensor (corresponding to the magnetic sensor 20 of FIG. 3) 200 is a rotation angle sensor that detects a rotation angle of the motor rotor 120, and is also a magnetic-pole position detection sensor that detects a magnetic-pole position of the sensor magnet 18 in the motor shaft 6a illustrated in FIG. 3. A detection signal (rotation angle) of the magnetic sensor 200 is input to the controller 300.

The controller 300 includes an inverter 310 and a control unit 320. The inverter 310 includes a U-phase arm including an upper-arm switching element 311a and a lower-arm switching element 311b connected in series, a V-phase arm including an upper-arm switching element 311c and a lower-arm switching element 311d connected in series, and a W-phase arm including an upper-arm switching element 311e and a lower-arm switching element 311f connected in series.

The respective arms included in the inverter 310 are connected in parallel between a positive pole line L1 of an in-vehicle direct-current power supply PS and a negative pole line L2 of the direct-current power supply PS, and form a three-phase bridge circuit. Each of the switching elements 311a to 311f includes an antiparallel diode D and is formed of a power semiconductor element, such as a field effect transistor (FET) or an insulated gate bipolar transistor (IGBT), for example.

Further, the inverter 310 includes current detection means for detecting a phase current. In this example, a shunt resistor 312u that outputs a current detection signal Iu corresponding to a U-phase current is interposed on a side closer to the negative pole line L2 in the U-phase arm, a shunt resistor 312v that outputs a current detection signal Iv corresponding to a V-phase current is interposed on a side closer to the negative pole line L2 in the V-phase arm, and a shunt resistor 312w that outputs a current detection signal Iw corresponding to a W-phase current is interposed on a side closer to the negative pole line L2 in the W-phase arm. The shunt resistors 312u, 312v, and 312w output potential differences between both ends thereof to the control unit 320, as the current detection signals Iu, Iv, and Iw corresponding to the respective phase currents, respectively.

The control unit 320 is configured to communicate to/from an external control device via a controller area network (CAN) or the like, and includes a microcomputer including an A/D converter, a processor such as a central processing unit (CPU), a writable storage memory such as a random access memory (RAM), a storage memory used exclusively for reading such as a read-only memory (ROM), and the like.

The microcomputer is connected to an input circuit and an output circuit. The input circuit receives detection signals of various sensors, and the output circuit outputs a control signal to the power semiconductor of the inverter 310. Further, as described later, the input circuit receives a mode switching signal MD, which is input manually by an operator during calibration of the rotation angle sensor 17. When the mode switching signal MD is input, a calibration operation is performed, which is described later.

The control unit 320 receives a rotation angle signal output from the rotation angle sensor 17 that detects a rotation angle of the motor rotor 120, the current detection signals Iu, Iv, and Iw output from the shunt resistors 312u, 312v, and 312w, and a signal of a target rotational speed ω* transmitted from the external control device, and outputs a control signal to the inverter 310 in accordance with these received signals.

Next, description is given of a calibration method for the rotation angle sensor 17 according to this embodiment in the electric motor having the above-mentioned configuration.

As described above, in the three-phase brushless electric motor 100, a rotation angle of the motor shaft 6a (see FIG. 2) is detected by using the rotation angle sensor 17 to control a current fed to the stator coil of the electric motor 100. Due to eccentricity of the motor shaft 6a, variation in magnetization strength of the sensor magnet 18 (see FIG. 3), or the like during a manufacturing process or an assembling process, the rotation angle sensor 17 produces a rotation angle error. It should be understood that a rotation angle error is produced also due to the other causes.

Figure 5:
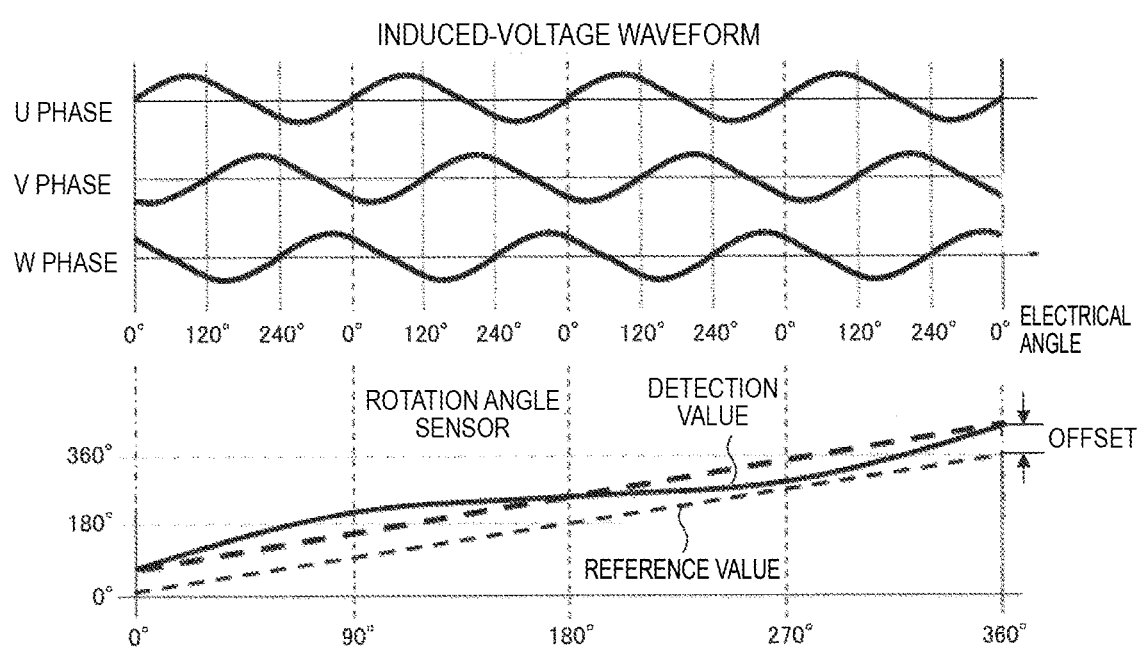
FIG. 5 is an explanatory graph for showing an error of the rotation angle sensor.

Thus, as shown in FIG. 5, when a current is fed to the three-phase coils of the U phase to the W phase to excite the coils, the rotation angle sensor 17 detects rotation of the motor rotor 120 by the motor shaft 6a (see FIG. 2). However, due to the above-mentioned causes, such as eccentricity of the motor shaft 6a or variation in magnetization strength of the sensor magnet 18, there often occurs a phenomenon in which a detection value of the rotation angle sensor 17 is different from a reference value (true value). When such a rotation angle error is produced, adverse influence such as variation in motor torque occurs. An offset is produced in a detection value, but the following description is given without consideration of an offset.

In order to eliminate such influence of a rotation angle error, it is effective to subject a rotation angle error between a reference value (true value) of a rotation angle and a detection value detected by the rotation angle sensor 17 to fast Fourier transform to obtain a frequency component of a predetermined order, convert the frequency component of the rotation angle error into an angle error by inverse fast Fourier transform to obtain a correction value, and reflect the obtained correction value in the detection value detected by the rotation angle sensor 17 to compensate for the rotation angle error.

Figure 6:
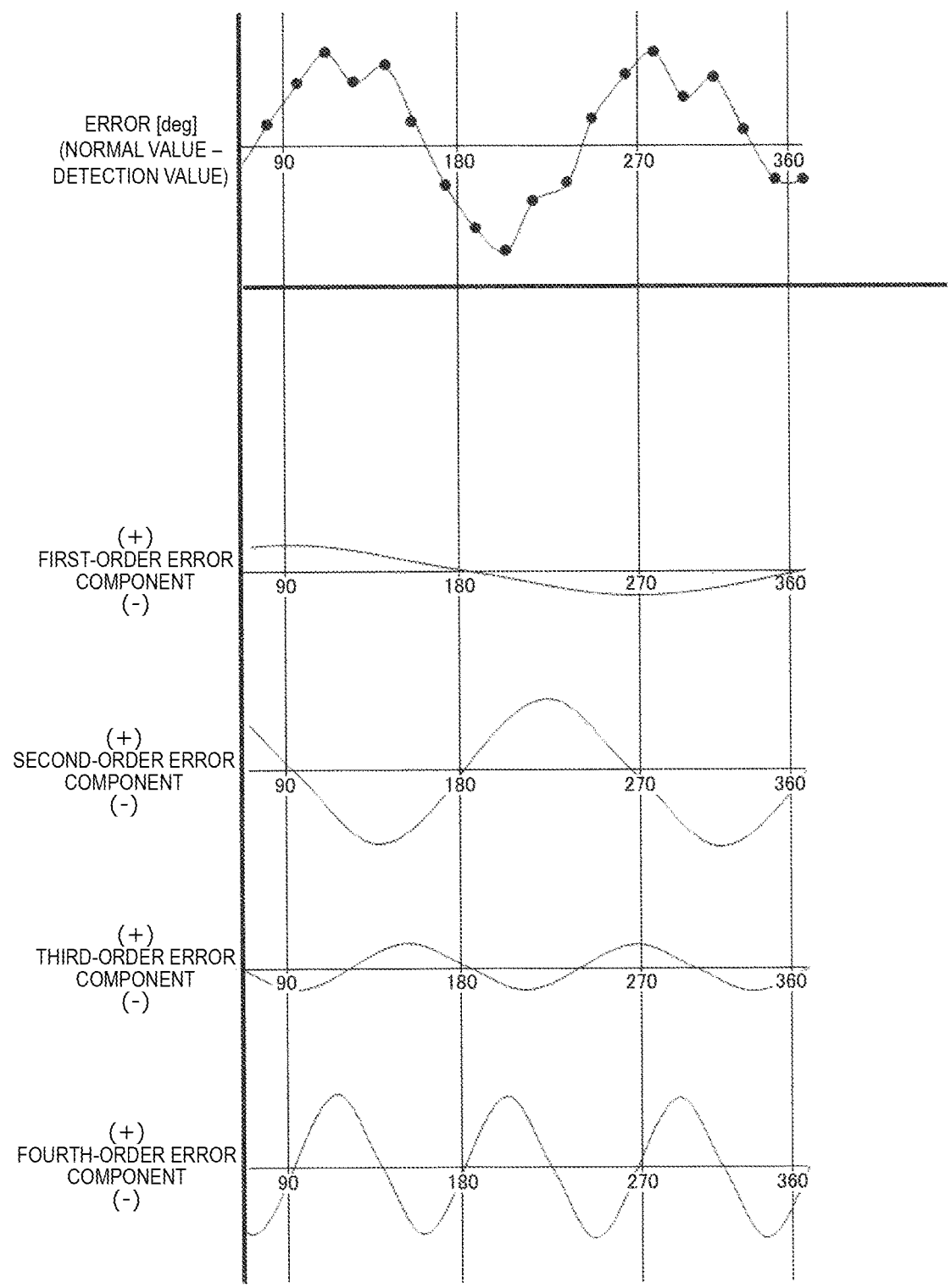
FIG. 6 is an explanatory graph for showing a frequency component of an error of the rotation angle sensor.

FIG. 6 shows a state in which a rotation angle error between a detection value detected by the rotation angle sensor 17 and a reference value (true value) of a rotation angle is subjected to discrete Fourier transform. A rotation angle error can be represented by a trigonometric function of a predetermined order when subjected to discrete Fourier transform.

FIG. 6 shows first-to-fourth-order error components. Note that, the order can be freely selected and is only required to ensure predetermined accuracy. In this embodiment, components up to the fourth order are to be calculated.

A rotation angle error at a predetermined rotation stop position is represented by "$\Delta\theta$". Then, the rotation angle error "AO" can be represented by the expression (1) where a reference value (angle) at the predetermined rotation stop position is "X", amplitudes of frequency components of respective orders are "Am1, Am2, ..., Amn", and phases of frequency components of respective orders are "Ph1, Ph2, ..., Phn". Further, "n" is an order.

$$\Delta\theta = Am1 * \text{Sin}(X + Ph1) + Am2 * \text{Sin}(2*X + Ph2) + \ldots + Amn * \text{Sin}(n*X + Phn) \quad (1)$$

The reference value (X) for obtaining a rotation angle error of the expression (1) can be obtained by using a reference rotation angle sensor in which an angle error is compensated for. In this embodiment, a reference angle having no rotation angle error in the normal reference rotation angle sensor is stored in advance in a storage element such as a ROM, as a true value.

For example, the reference values (X) per rotation of the motor rotor 120 are stored as reference values indicated by the thin broken line of FIG. 5. In this embodiment, 24 rotation angle errors are obtained per rotation of the motor rotor 120, and hence a reference value is stored for each of angles in 360°/24 (=15°) increments. Further, it is also possible to measure the reference value of the rotation angle sensor by mounting the reference rotation angle sensor in which an error is compensated for, onto the motor shaft 6a and using the reference rotation angle sensor together with a rotation sensor being calibrated.

Then, the rotation angle error of the expression (1) is subjected to fast Fourier transform, and thus an n-th-order frequency component is obtained. A rotation angle error at a rotation stop position is represented by "AO". Then, the rotation angle error "AO" can be represented by the expression (2) where a reference value (angle) of the rotation stop position is "X", amplitudes of sine-wave components of respective orders are "Am1S, Am2S, ... AmnS", and amplitudes of cosine-wave components of respective orders are "Am1C, Am2C, ..., AmnC". Further, "n" is an order.

$$\Delta\theta = Am1S * \text{Sin}(X) + Am1C * \text{Cos}(X) + Am2S * \text{Sin}(2*X) + Am2C * \text{Cos}(2*X) + \ldots + AmnS * \text{Sin}(n*X) + AmnC * \text{Cos}(n*X) \quad (2)$$

Therefore, by storing an amplitude (AmnS) of a sine-wave component of a rotation angle error, an amplitude (AmnC) of a cosine-wave component of a rotation angle error, and a phase (Phn) for each order, it is possible to compensate for a rotation angle error produced at the time of detection of a rotation angle by the rotation angle sensor 17 in actual control. Note that, in a case in which a rotation angle error is represented by the expression (2) as described above, all of frequency components are not required to be stored, and it is only required that components up to an order that are enough to provide required accuracy be stored.

For example, in a case in which components up to the fourth order are stored, the following table can be formed from the expression (2). In this embodiment, an EEPROM is used as the table.

$$\{Am1S, Am1C, Am2S, Am2C, \ldots, Am4S, Am4C\} \quad (3)$$

These are sensor-error correction parameters for compensating for a rotation angle error and are used in actual calculation of a correction value of a rotation angle to obtain a correction value.

Here, in order to generate a sensor-error correction parameter of the rotation angle sensor 17, the above-mentioned arithmetic expression is used, and an error in a detection value of the rotation angle sensor 17 is substituted into this arithmetic expression. To adopt such method can reduce a calculation load and the number of memories as compared to a case in which an error is stored by using a map.

In the above, basic calculation for obtaining a sensor-error correction parameter for correcting a rotation angle error has been described. However, actually, a rotation stop position of the motor rotor 120 is not accurate, and hence a detection value varies, which causes a problem of failing to obtain an accurate rotation angle error. For this reason, in this embodiment, the rotation angle sensor 17 is calibrated in the following manner.

Figure 7:
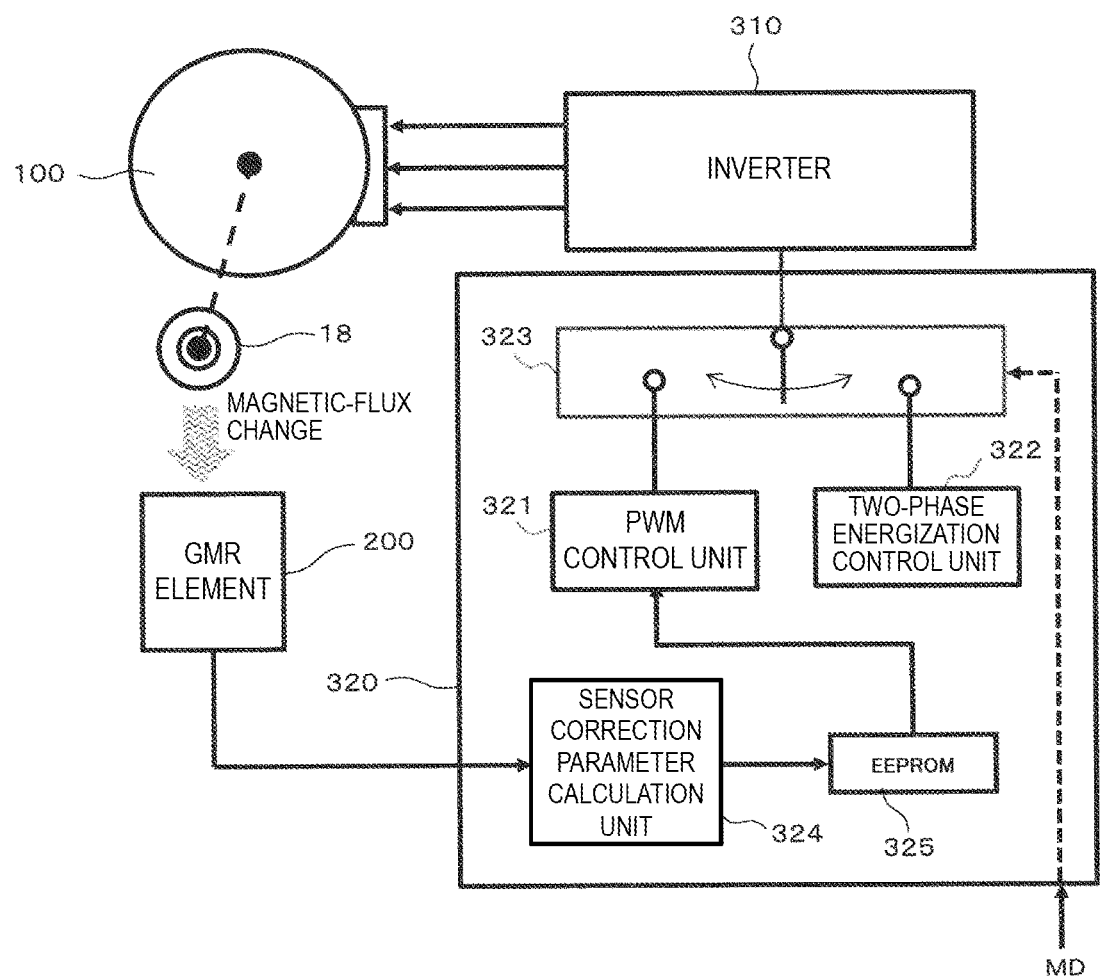
FIG. 7 is a configuration diagram for illustrating a calibration method for a rotation sensor according to an embodiment of the present invention.

FIG. 7 shows a configuration for correcting a rotation angle error for each electric motor. Rotation of the motor rotor 120 of the electric motor 100 is detected by the rotation angle sensor 17. This is the same as in the related-art. In this embodiment, the control unit 320 includes a normal PWM control unit 321, a two-phase energization control unit 322, and a mode switching unit 323.

In the PWM control unit 321, first, an actual current value of each phase corresponding to the current detection signals Iu, Iv, and Iw is subjected to coordinate transformation by using a predetermined arithmetic expression, and a d-axis actual current value Id that is an actual current value of a d-axis and a q-axis actual current value Iq that is an actual current value of a q-axis are calculated.

Subsequently, a d-axis target current value Id* and a q-axis target current value Iq* are calculated based on an actual rotational speed ω and the target rotational speed ω* transmitted from the external control device. Specifically, the d-axis target current value Id* and the q-axis target current value Iq* are calculated by referring to a data table in which the d-axis target current value Id* and the q-axis target current value Iq* are set in advance in association with a deviation between the actual rotational speed ω and the target rotational speed co*.

Subsequently, a d-axis applied-voltage command value Vd* that is a d-axis component of a terminal voltage to be applied to the electric motor 100 and a q-axis applied-voltage command value Vq* that is a q-axis component of the terminal voltage are calculated based on the d-axis actual current value Id and the q-axis actual current value Iq, and the d-axis target current value Id* and the q-axis target current value Iq*.

Subsequently, the d-axis applied-voltage command value Vd* and the q-axis applied-voltage command value Vq* are subjected to coordinate transformation by using a predetermined arithmetic expression, and a U-phase applied-voltage command value Vu* that is a terminal voltage to be applied to the U-phase coil 110U, a V-phase applied-voltage command value Vv* that is a terminal voltage to be applied to the V-phase coil 110V, and a W-phase applied-voltage command value Vw* that is a terminal voltage to be applied to the W-phase coil 110W, are calculated.

Lastly, a PWM signal determined by a duty that is an ON/OFF ratio in PWM control of the switching elements 311a to 311f is generated as a control signal to be output to control terminals of the switching elements 311a to 311f. The duty is calculated in accordance with the U-phase applied-voltage command value Vu*, the V-phase applied-voltage command value Vv*, and the W-phase applied-voltage command value Vw*.

The foregoing description has discussed control of a three-phase brushless electric motor, which is well-known, and hence further description thereof is omitted. In this case, an electric motor operates normally, and hence the mode switching unit 323 brings the inverter 310 and the PWM control unit 323 into a connected state.

Next, description is given of a case in which a rotation angle error of the rotation angle sensor 17 is corrected. A rotation angle error is corrected when an electric motor having been completed is mounted in an applicable product such as an electric power steering apparatus, for example, before factory shipment.

When an operator inputs the mode switching signal MD, the mode switching signal MD is provided to the mode switching unit 323, and the mode switching unit 323 connects the inverter 310 and the two-phase energization control unit 322. Then, the two-phase energization control unit 322 energizes two coils.

The two-phase energization control unit 322 generates a control signal that is output to control terminals (gate terminals) of the switching elements 311a to 311f (see FIG. 4), and sequentially excites the three-phase coils 110U, 110V, and 110W of the stator 110 so that predetermined rotation angles at the plurality of rotation stop positions (see FIG. 8) are achieved by two-phase energization.

The control signal output from the two-phase energization control unit 322 energizes and excites two-phase coils out of the three-phase coils including the U-phase coil 110U, the V-phase coil 110V, and the W-phase coil 110W while sequentially changing the two coils being energized for each of the predetermined rotation angles. In this embodiment, the coils are changed every 15° as described above. The electric motor in this embodiment is configured so as to achieve rotation of a 90° mechanical angle per rotation of a 360° electrical angle (in one cycle) as is seen from FIG. 5.

Figure 8:
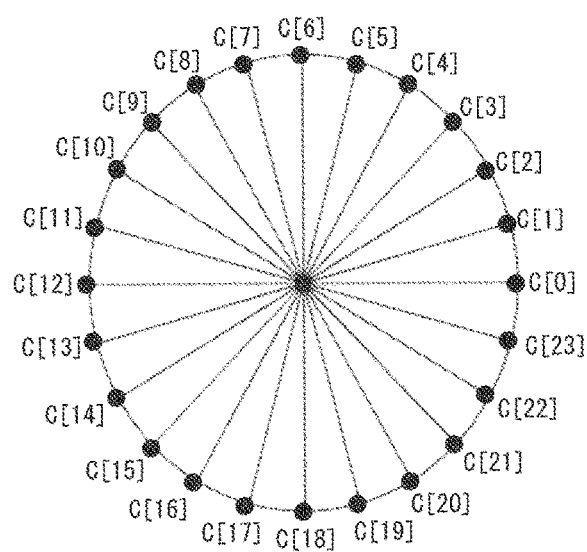
FIG. 8 is an explanatory view for illustrating detection angles of the rotation sensor.

In this embodiment, as indicated by rotation angle C[0] to rotation angle C[23] of FIG. 8, excitation is performed to rotate the motor rotor 120 every 15°, and an output of the rotation angle sensor 17 at a rotation stop position at a rotation angle C[n] is detected. Because of two-phase energization control, a stop position of the motor rotor 120 can be accurately determined, and hence detection accuracy can be improved.

Two-phase energization control can be achieved by control of an output to the control terminals of the switching elements 311a to 311f in the inverter 310 in the following manner. Description is given below with reference to FIG. 4.

For example, a control signal that places the switching element 311a and the switching element 311d in an ON state and places all the other switching elements in an OFF state is generated. As a result, a voltage V is applied as a U-phase terminal voltage Vu and a voltage (−V) is applied as a V-phase terminal voltage Vv so that a holding current flows from the U phase to the V phase only for a predetermined time. Here, the predetermined time corresponds to a period of time for which the motor rotor 120 is settled at a stop position. The same applies for a predetermined time described below.

Further, a control signal that places the switching element 311a and the switching element 311f in an ON state and places all the other switching elements in an OFF state is generated. As a result, the voltage V is applied as the U-phase terminal voltage Vu and the voltage (−V) is applied as a W-phase terminal voltage Vw so that a holding current flows from the U phase to the W phase only for a predetermined time.

Further, a control signal that places the switching element 311c and the switching element 311f in an ON state and places all the other switching elements in an OFF state is generated. As a result, the voltage V is applied as the V-phase terminal voltage Vv and the voltage (−V) is applied as the W-phase terminal voltage Vw so that a holding current flows from V phase to W phase only for a predetermined time.

Further, a control signal that places the switching element 311c and the switching element 311b in an ON state and places all the other switching elements in an OFF state is generated. As a result, the voltage V is applied as the V-phase terminal voltage Vv and the voltage (−V) is applied as the U-phase terminal voltage Vu so that a holding current flows from the V phase to the U phase only for a predetermined time.

Further, a control signal that places the switching element 311e and the switching element 311b in an ON state and places all the other switching elements in an OFF state is generated. As a result, the voltage V is applied as the W-phase terminal voltage Vw and the voltage (−V) is applied as the U-phase terminal voltage Vu so that a holding current flows from the W phase to the U phase only for a predetermined time.

Moreover, a control signal that places the switching element 311e and the switching element 311d in an ON state and places all the other switching elements in an OFF state is generated. As a result, the voltage V is applied as the W-phase terminal voltage Vw and the voltage (−V) is applied as the V-phase terminal voltage Vv so that a holding current flows from W phase to V phase only for a predetermined time.

Thus, the coil applied with the voltage (V) is magnetized to the N pole, and the coil applied with the voltage (−V) is magnetized to the S pole. Then, the permanent magnet of the motor rotor 120 in the vicinity of the N pole and the S pole is attracted by the N pole and the S pole generated in the coils, and hence a rotation stop position of the motor rotor 120 can be accurately determined.

In this manner, the S pole of the motor rotor 120 is attracted to the coil magnetized to the N pole by excitation and is settled at a position at which the S pole of the motor rotor 120 is closest to the coil. The position of the coil corresponds to the position of the slot. Thus, the motor rotor 120 can be rotated accurately to a rotation stop position of each slot.

Further, by exciting both of two adjacent coils, it is also possible to rotate the motor rotor 120 so that the S pole of the motor rotor 120 is brought closest to a position intermediate between the two coils. Thus, the motor rotor 120 can be rotated accurately to N rotation stop positions equal to the slots in number, or to twice as many rotation stop positions as N. In this embodiment, in the three-phase brushless electric motor with 12 slots, detection values of the rotation angle sensor 17 are measured in the maximum number that allows control of a rotation stop position of the motor shaft, which enables generation of a more accurate sensor-error correction parameter.

In this embodiment, in rotating the motor rotor to a predetermined rotation stop position, two predetermined coils out of the three-phase coils of the stator coil are excited. Then, the coils being excited are sequentially changed, and thus the motor rotor 120 can be accurately rotated to, and stopped at, a rotation stop position at each rotation angle to be detected.

A rotation stop position depends on a pair of two coils being excited and has high reproducibility. In other words, the motor rotor 120 can be rotated to the same rotation stop position even after excitation is performed a plurality of times. Note that, while two-phase coils are excited simultaneously by the two-phase energization control unit in the foregoing description, the motor rotor 120 can be rotated by excitation of only a single-phase coil.

Then, detection values of the rotation angle sensor 17 at positions at the 24 predetermined angles illustrated in FIG. 8 are input to a sensor-error correction parameter calculation unit 324 of the control unit 320. In the sensor-error correction parameter calculation unit 324, the input detection values are compared to the reference value, and differences from the reference value (rotation angle errors) are obtained. The reference value has been obtained and stored in the ROM in advance as described above.

The obtained rotation angle error is subjected to the above-mentioned fast Fourier transform, and an amplitude (AmnS) of a sine-wave component of a rotation angle error, an amplitude (AmnC) of a cosine-wave component of a rotation angle error, and a phase (Phn) for each order that are sensor-error correction parameters are obtained and stored in an EEPROM 325, which is a rewritable storage element. Then, acquisition of a sensor-error correction parameter required for calibration of the rotation angle sensor 17 ends.

The sensor-error correction parameter stored in the EEPROM 325 is read out during a process of detecting a rotation angle in actual control, and is substituted into an arithmetic expression having been subjected to inverse fast Fourier transform, and thus a correction value is obtained. The correction value is reflected in an actual detection value detected by the rotation angle sensor 17. This enables accurate detection of a rotation angle.

Figure 9:
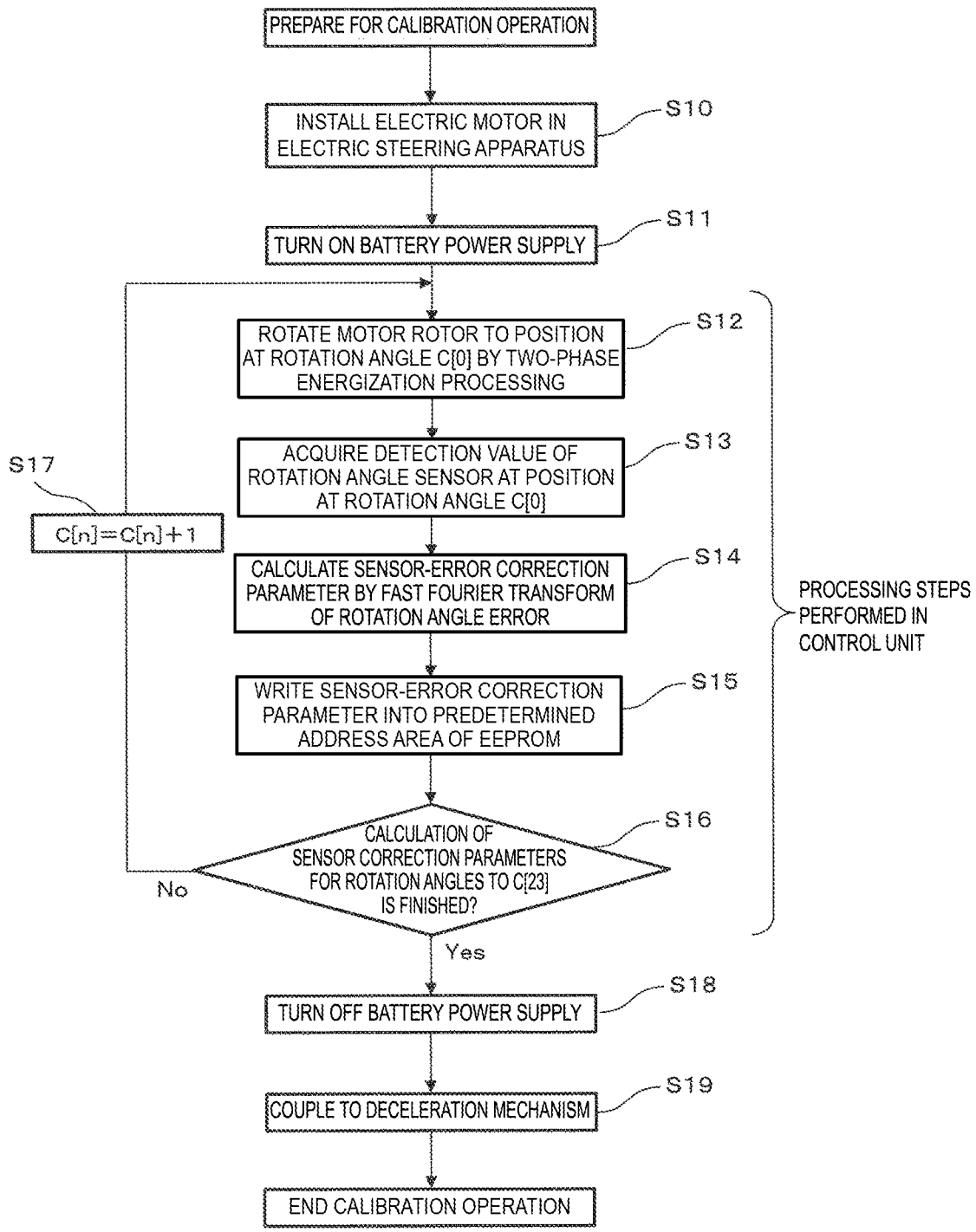
FIG. 9 is a flowchart for illustrating the calibration method for a rotation angle sensor performed in the electric power steering apparatus before factory shipment.

Next, a specific calibration method for the rotation angle sensor 17 before factory shipment is described with reference to FIG. 9. First, for a calibration operation, various kinds of measurement apparatus, a power supply circuit, and the like are prepared. After the preparation for the calibration operation ends, an operation of Step S10 is performed.

Step S10>> In Step S10, an electric motor is installed in an electric steering apparatus. The electric motor at that time has N slots and rotates a motor shaft to N rotation stop positions or to twice as many rotation stop positions as N. Specifically, the number of the slots is 12, and the motor shaft is rotated to 24 rotation stop positions.

The electric motor applies steering force to a power steering apparatus of a vehicle and includes a motor housing and a bearing as illustrated in FIG. 2 and FIG. 3. Further, the rotation angle sensor 17(17) includes the sensor magnet 18 and the magnetic sensor (detection element) 20. The sensor magnet 18 is provided onto the motor shaft, and the magnetic sensor 20 can detect a change in magnetic flux generated by the sensor magnet 18.

Under the above-mentioned state, the electric motor and a deceleration mechanism are disconnected from each other. This is because performing an excitation step described later with the electric motor being disconnected from the deceleration mechanism allows the motor shaft to rotate with no rotation load on the deceleration mechanism. Thus, an increase in power for excitation can be suppressed. After the installation of the electric motor ends, the process proceeds to an operation of Step S11.

Step S11>> In Step S11, the electric motor is connected to a battery power supply, which is then turned on. This causes the control unit 320 to start to operate. Then, this case is directed to a calibration mode of the rotation angle sensor 17, and hence the control unit 320 externally receives the mode switching signal MD and causes the mode switching unit 323 to operate, thereby connecting the inverter 310 and the two-phase energization control unit 322. After that, a sensor-error correction parameter is calculated in the following steps in accordance with a program of the control unit 320.

Step S12>> Step S12 is an excitation step. In Step S12, first, the motor rotor 120 is rotated to a rotation angle position at a rotation angle C[0] by two-phase energization control. The two-phase energization control is as is described above. With the two-phase energization control, the motor rotor 120 is rotated accurately to a predetermined rotation stop position. After the excitation step ends, Step S13 is performed.

Step S13>> Step S13 is a rotation-position detection step. In Step S13, under a state in which the motor rotor 120 has been rotated in Step S12, an angle detected by the rotation angle sensor 17 at the position at the rotation angle C[0] is acquired as a detection value. After the acquisition of the detection value ends, the detection value is temporarily stored in a RAM serving as a work area.

At that time, the electric motor is disconnected from the deceleration mechanism of the steering apparatus. Consequently, the excitation step is performed under the state in which the electric motor is disconnected from the deceleration mechanism, and hence the motor shaft can be rotated with no rotation load on the deceleration mechanism. This can suppress an increase in power for excitation. Further, the rotational speed of the motor shaft 6a is prevented from being reduced, which can encourage shortening of time for the excitation step and the rotation-position detection step. After the acquisition of the detection value ends, calculation in Step S14 is performed.

<<Step S14>> Step S14 is a sensor-error correction parameter generation step. In Step S14, the reference value that corresponds to the rotation angle C[0] and has been obtained and stored in the ROM in advance is read out, and the difference from the detection value detected in Step S13 is obtained as a rotation angle error.

The obtained rotation angle error is subjected to fast Fourier transform in the manner described in the expressions (1) and (2) given above, and the above-mentioned sensor-error correction parameter is obtained. Specific examples of the parameter include an amplitude (AmnS) of a sine-wave component of a rotation angle error, an amplitude (AmnC) of a cosine-wave component of a rotation angle error, and a phase (Phn) for each order, which have been described above. After the sensor-error correction parameter is obtained, a processing step of Step S15 is performed.

<<Step S15>> Step S15 is a sensor-error correction parameter storage step. In Step S15, the sensor-error correction parameter that has been obtained in Step S14 and includes an amplitude (AmnS) of a sine-wave component of a rotation angle error, an amplitude (AmnC) of a cosine-wave component of a rotation angle error, and a phase (Phn) for each order is stored in the EEPROM 325 (see FIG. 7).

In the excitation step of Step S12, a clockwise excitation step of exciting the stator coil so that the motor shaft 6a is rotated clockwise, and a counterclockwise excitation step of exciting the stator coil so that the motor shaft 6a is rotated counterclockwise, may be performed. In this case, the rotation-position detection step and the sensor-error correction parameter generation step are also processing steps that are modified accordingly.

More specifically, in the rotation-position detection step of Step S13, a step of acquiring a detection value of the rotation angle sensor 17 for rotation of the motor shaft 6a to a position at the rotation angle C[0] in the clockwise excitation step, and a step of acquiring a detection value of the rotation angle sensor 17 for rotation of the motor shaft 6a to a position at the rotation angle C[0] in the counterclockwise excitation step, are performed.

Further, in the sensor-error correction parameter generation step of Step S14, calculation for obtaining an average value of a sensor-error correction parameter for rotation of the motor shaft 6a to a position at the rotation angle C[0] in the clockwise excitation step and a sensor-error correction parameter for rotation of the motor shaft 6a to a position at the rotation angle C[0] in the counterclockwise excitation step, is performed.

For example, while detection positions are set in 150 increments in this embodiment, in performing detection at a 30° position, a slight deviation occurs in some cases between a detection value of the rotation angle sensor 17 at the 30° position for clockwise rotation to the 30° position from a 15° position and a detection value of the rotation angle sensor 17 at the 30° position for counterclockwise rotation to the 30° position from a 450 position.

The reason for this is as follows. Because of the inertia of the motor rotor or the motor shaft 6a, rotation of the motor shaft 6a is vibrating from the time when excitation is performed to rotate the motor shaft 6a to the 300 position to the time when the motor shaft 6a is settled at the 300 position. Then, in determining a detection value, a detection value provided under a state in which the motor shaft 6a is vibrating is determined as a detection value by averaging processing or the like.

Specifically, the vibration property of rotation of the motor shaft 6a differs depending on whether rotation is clockwise or counterclockwise. Also a detection value subjected to averaging processing differs depending on the rotation direction.

In a case in which an electric motor is rotated in both directions as in a drive electric motor of an electric power steering apparatus, an average value of detection values of the rotation angle sensor 17 that are detected from rotation in both directions is used also for a sensor-error correction parameter. This can reduce variation in sensor-error correction parameter due to a difference in rotation direction of the electric motor.

After the processing of storing the sensor-error correction parameter for the rotation angle C[0] ends in Step S15, a processing step of Step S16 is performed.

<<Step S16>> In Step S16, it is determined whether sensor-error correction parameters for the plurality of predetermined rotation angles (C[0] to C[23]) illustrated in FIG. 8 are acquired and stored. When it is determined that acquisition and storage of parameters for the predetermined rotation angles to C[23] are not finished in Step S16, Step S17 is performed. In contrast, when it is determined that acquisition and storage of parameters for the predetermined rotation angles to C[23] are finished, Step S18 is performed.

<<Step S17>> In Step S17, a predetermined rotation angle next to a predetermined rotation angle for which Step S12 to Step S15 have been performed is designated, and the process returns back to Step S12. The excitation step, the rotation-position detection step, the sensor-error correction parameter generation step, and the sensor-error correction parameter storage step for the designated predetermined rotation angle C[n] are performed again. These steps are repeated, and after the foregoing steps for the rotation angles to C[23] are finished, Step S18 is performed.

<<Step S18>> In Step S18, the sensor-error correction parameters for the 24 predetermined angles have been acquired, and hence the battery power supply is turned off and calibration of the rotation sensor ends. After the battery power supply is turned off, Step S19 is performed.

<<Step S19>> In Step S19, the electric motor and the deceleration mechanism are coupled to each other, and the calibration operation in the electric power steering apparatus ends. The electric motor is configured so as to be coupled through intermediation of the belt as illustrated in FIG. 2.

In this embodiment, with the electric motor used in the electric power steering apparatus having been assembled, the excitation step and the rotation-position detection step are performed. This enables generation of a sensor-error correction parameter suitable for use in the electric power steering apparatus.

For example, the motor shaft 6a has predetermined inclination while being supported by the motor housing 6h via the bearing. The inclination component causes an error having a frequency component included in a detection value of the rotation angle sensor 17. Then, the excitation step and the rotation-position detection step are performed under a condition in which the error is produced, which enables generation of a highly-accurate sensor-error correction parameter that can correct the error.

Further, while the case in which a single rotation angle sensor 17 is used has been described in this embodiment, two rotation angle sensors are used in some cases in keeping with a recent trend toward a redundant system. In such a case, the following method is conceivable.

Specifically, the rotation angle sensor 17 includes a first rotation angle sensor and a second rotation angle sensor. Then, in the rotation-position detection step, it is only required to acquire a detection value of the first rotation angle sensor and a detection value of the second rotation angle sensor each at a position at a predetermined rotation angle for rotation of the motor shaft 6a to a predetermined rotation stop position in the excitation step.

In a case in which the rotation angle sensor 17 includes a plurality of rotation angle sensors, such as the first rotation angle sensor and the second rotation angle sensor, to perform detection in the plurality of rotation angle sensors at the same time can encourage shortening of a measurement time in the rotation-position detection step. Further, the plurality of rotation angle sensors detect angles at predetermined rotation stop positions of the motor shaft 6a while the motor shaft 6a is being rotated in the same manner, which can reduce a difference in measurement between the plurality of rotation angle sensors.

The sensor-error correction parameters acquired by the above-mentioned calibration operation are stored in the EEPROM 325. The sensor-error correction parameters vary among electric motors, and thus are stored in association with the respective electric motors.

Figure 10:
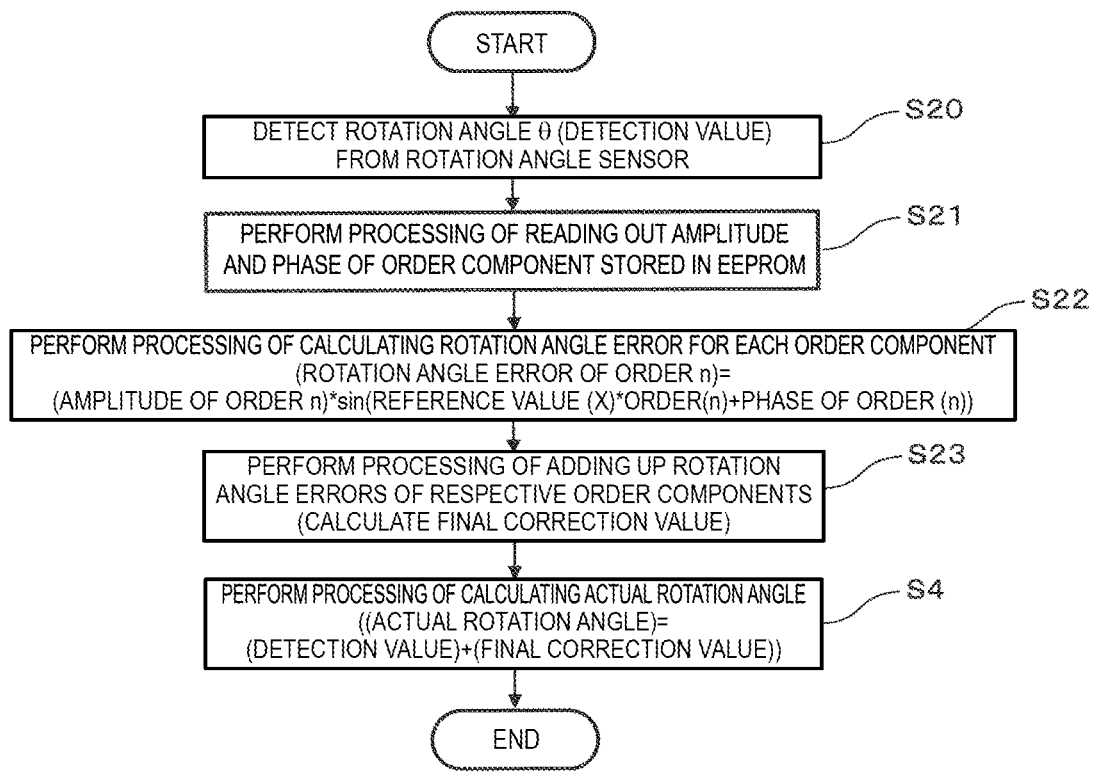
FIG. 10 is a flowchart for illustrating actual control for correcting a detection value of the rotation angle sensor.

Next, a method of correcting a rotation angle error in actual control is described. FIG. 10 shows a control flow performed in the control unit 320. The mode switching unit 323 is connected to the PWM control unit 321, and the sensor-error correction parameter stored in the EEPROM 325 is used in control for obtaining a rotation angle in the PWM control unit 321.

<<Step 20>> In Step S20, an actual rotation angle of the motor shaft 6a is detected by the rotation angle sensor 17, and the detection value θ is temporarily stored in the RAM serving as a work area. After detection of the rotation angle ends, the process proceeds to Step S21.

<<Step S21>> In Step S21, the sensor-error correction parameter having been acquired in the preceding calibration operation is read out from the EEPROM 325. The sensor-error correction parameter includes an amplitude (AmnS) of a sine-wave component of a rotation angle error, an amplitude (AmnC) of a cosine-wave component of a rotation angle error, and a phase (Phn) for each order. After the sensor-error correction parameter is read out, the process proceeds to Step S22.

<<Step S22>> In Step S22, processing of calculating a rotation angle error of each order component is performed. The amplitude (AmnS) of a sine-wave component, the amplitude (AmnC) of a cosine-wave component of a rotation angle error, and the phase (Phn) that have been read out are substituted into the following arithmetic expression to obtain an amplitude (Amn) of a rotation angle error component for each order.

$$Amn = AmnS*\mathrm{Sin}Phn + AmnC*\mathrm{Cos}Phn \quad (4)$$

Then, after the amplitude (Amn) for each order is obtained, a rotation angle error for each order is calculated. The calculation can be performed by using the above-mentioned expression (1) in the following manner.

$$\Delta\theta(n) = Amn*\mathrm{Sin}(n*X + Phn) \quad (5)$$

Thus, components up to the fourth order are obtained in this embodiment, and hence rotation angle errors can be obtained by substitution of the values of the first-to-fourth order components. After the rotation angle error for each order is obtained, the process proceeds to Step S23.

<<Step S23>> In Step S23, all the rotation angle errors for respective orders obtained in Step S22 are added up to obtain a final rotation angle error (correction value). Specifically, as the processing steps of Step S22 and Step S23, calculation of "$\Delta\theta = \Sigma Amn*\mathrm{Sin}(n*X + Phn) \ldots (6)$" is performed. After the final correction value is obtained, the process proceeds to Step S24.

<<Step S24>> In Step S24, the rotation angle error Δθ obtained in Step S3 is reflected in the detection value θ detected in Step S20 in the following manner. A rotation angle in which an error is reflected is represented by "θc". In this case, the rotation angle is as follows.

$$\theta c = \theta \pm \Delta\theta \quad (6)$$

The rotation angle error of the rotation angle sensor is corrected by the sensor-error correction parameter in the above-mentioned manner, and hence PWM control of the electric motor can be accurately performed.

As described above, in the present invention, the motor shaft 6a is rotated to a predetermined rotation stop position by excitation of two-phase coils out of three-phase coils of a stator coil, and a detection value of the rotation angle sensor at the rotation stop position is acquired. Then, a sensor-error correction parameter for correcting a detection value of the rotation angle sensor in drive control of an electric motor is generated from the acquired detection value of the rotation angle sensor.

With this configuration, in rotating the motor rotor to the predetermined rotation stop position, two coils out of the three-phase coils of the stator coil are excited. By sequentially changing the coils being excited, it is possible to cause the motor rotor to stop accurately at the predetermined rotation stop position.

The rotation stop position depends on a phase of a coil being excited and has extremely high reproducibility. In other words, the motor rotor can be stopped at substantially the same rotation stop position even after the excitation step is performed a plurality of times.

As described above, a sensor-error correction parameter is generated by using a detection value of the rotation angle sensor detected at a highly-reproducible rotation stop position of the motor rotor, thereby being capable of obtaining a highly-accurate sensor correction value.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2020-025058 filed on Feb. 18, 2020. All disclosed contents including Specification, Scope of Claims, Drawings, and Abstract of Japanese Patent Application No. 2020-025058 filed on Feb. 18, 2020 are incorporated herein by reference in their entirety.

REFERENCE SIGNS LIST

1 . . . electric power steering apparatus, 4 . . . rack bar (steering shaft), 6 . . . electric motor, 7 . . . ball screw mechanism, 8 . . . nut, 9 . . . nut-side pulley, 18 . . . sensor magnet, 20 . . . magnetic sensor (rotation angle sensor), 110U . . . U-phase coil, 110V . . . V . . . phase coil, 110W . . . W-phase coil, 200 . . . rotation angle sensor, 310 . . . inverter, 311a to 311f . . . IGBT, or MOSFET, 320 . . . control unit, 321 . . . PWM control unit, 322 . . . two-phase energization control unit, 323 . . . mode switching unit, 324 . . . sensor-error correction parameter calculation unit, 325 . . . EEPROM

The invention claimed is:

1. A calibration method for a rotation angle sensor for an electric motor,
the electric motor including:
a stator coil including coils of a U phase, a V phase, and a W phase;
a motor rotor to be rotated by excitation of the stator coil;
a motor shaft to be rotated in conjunction with the motor rotor; and
the rotation angle sensor configured to detect a rotation position of the motor shaft,
the method comprising:
an excitation step including the steps of:
exciting a predetermined single-phase coil or a first pair of coils including predetermined two-phase coils out of the coils of the stator coil, to thereby rotate the motor shaft to a first rotation stop position; and
exciting a coil different from the predetermined single-phase coil or a second pair of coils different from the first pair of coils, to thereby rotate the motor shaft to a second rotation stop position;
a rotation-position detection step including the steps of:
acquiring a detection value of the rotation angle sensor at the first rotation stop position; and
acquiring a detection value of the rotation angle sensor at the second rotation stop position; and
a sensor-error correction parameter generation step of generating a sensor-error correction parameter for correcting a detection value of the rotation angle sensor in drive control of the electric motor, from the detection values of the rotation angle sensor acquired in the rotation-position detection step.

2. The calibration method for a rotation angle sensor according to claim 1, wherein the sensor-error correction parameter generation step includes generating the sensor-error correction parameter by substitution of the detection values of the rotation angle sensor into a sensor-error correction parameter calculation expression.

3. The calibration method for a rotation angle sensor according to claim 2, wherein the sensor-error correction parameter calculation expression is an arithmetic expression including an amplitude and a phase as variables.

4. The calibration method for a rotation angle sensor according to claim 1,
wherein the excitation step further includes:
a clockwise excitation step of exciting the stator coil so that the motor shaft is rotated clockwise; and
a counterclockwise excitation step of exciting the stator coil so that the motor shaft is rotated counterclockwise,
wherein the rotation-position detection step further includes the steps of:
acquiring detection values of the rotation angle sensor for rotation of the motor shaft to the first rotation stop position and to the second rotation stop position in the clockwise excitation step; and
acquiring detection values of the rotation angle sensor for rotation of the motor shaft to the first rotation stop position and to the second rotation stop position in the counterclockwise excitation step,
wherein the sensor-error correction parameter generation step includes using an average value of the detection value of the rotation angle sensor for rotation of the motor shaft to the first rotation stop position in the clockwise excitation step and the detection value of the rotation angle sensor for rotation of the motor shaft to the first rotation stop position in the counterclockwise excitation step as the detection value of the rotation angle sensor, and
wherein the sensor-error correction parameter generation step includes using an average value of the detection value of the rotation angle sensor for rotation of the motor shaft to the second rotation stop position in the clockwise excitation step and the detection value of the rotation angle sensor for rotation of the motor shaft to the second rotation stop position in the counterclockwise excitation step as the detection value of the rotation angle sensor.

5. The calibration method for a rotation angle sensor according to claim 1,
wherein the electric motor includes N slots,
wherein the excitation step is a step of rotating the motor shaft to N rotation stop positions or to twice as many rotation stop positions as N, and
wherein the rotation-position detection step is a step of acquiring detection values of the rotation angle sensor at the N rotation stop positions or at the twice as many rotation stop positions as N.

6. The calibration method for a rotation angle sensor according to claim 5,
wherein the electric motor includes 12 slots,
wherein the excitation step is a step of rotating the motor shaft to 24 rotation stop positions, and
wherein the rotation-position detection step is a step of acquiring detection values of the rotation angle sensor at the 24 rotation stop positions.

7. The calibration method for a rotation angle sensor according to claim 1,
wherein the electric motor is configured to apply steering force to a steering apparatus of an automobile, and further includes a motor housing and a bearing,
wherein the rotation angle sensor includes a sensor magnet and a magnetic sensor, wherein the sensor magnet is provided onto the motor shaft,
wherein the magnetic sensor is configured to detect a change in magnetic field generated by the sensor magnet, and
wherein the stator coil, the motor rotor, the motor shaft, and the bearing are installed in the motor housing, and the excitation step and the rotation-position detection step are performed under a state in which the sensor magnet is installed onto the motor shaft.

8. The calibration method for a rotation angle sensor according to claim 7,
wherein the steering apparatus is applied with rotational force of the electric motor via a deceleration mechanism, and wherein the excitation step and the rotation-position detection step are performed under a state in which the electric motor is disconnected from the deceleration mechanism.

9. The calibration method for a rotation angle sensor according to claim 1, wherein the method includes:
determining whether sensor-error correction parameters for a plurality of predetermined rotation angles are acquired; and
performing the excitation step, the rotation-position detection step, and the sensor-error correction parameter generation step at a predetermined rotation angle in response to determining that the plurality of predetermined rotation angles are not acquired.

* * * * *